US005504491A

United States Patent [19]
Chapman

[11] Patent Number: 5,504,491
[45] Date of Patent: Apr. 2, 1996

[54] GLOBAL STATUS AND POSITION REPORTING SYSTEM

[76] Inventor: Robert W. Chapman, 2450 Hollywood Blvd., Suite 406, Hollywood, Fla. 33020

[21] Appl. No.: 231,649

[22] Filed: Apr. 25, 1994

[51] Int. Cl.⁶ ...................................................... G01S 5/02
[52] U.S. Cl. ........................... 342/357; 342/457; 364/449
[58] Field of Search .................................. 342/457, 357; 364/449

[56] References Cited

U.S. PATENT DOCUMENTS

| | | | |
|---|---|---|---|
| 4,077,005 | 2/1978 | Bishop | 325/32 |
| 4,596,988 | 6/1986 | Wanka | 343/457 |
| 5,043,736 | 8/1991 | Darnell et al. | 342/357 |
| 5,119,102 | 6/1992 | Barnard | 342/357 |
| 5,223,844 | 6/1993 | Mansell et al. | 342/357 |
| 5,224,842 | 7/1993 | Brown et al. | 342/357 |

Primary Examiner—Thomas H. Tarcza
Assistant Examiner—Dao L. Phan
Attorney, Agent, or Firm—Oltman and Flynn

[57] ABSTRACT

A global status and position reporting system for a remote unit having a status and position transmit/receive unit with at least one status and/or event input connected to a respective status and/or event sensor for reporting at least one system status and/or event and position of the remote unit, and a status output connected to a communication interface; at least one base unit adapted for receiving a status and position report, disposed at a position spaced away from the remote unit; position independent communications means including communications interfaces respectively disposed in the remote unit and in the base unit for transmitting a status and position report from the remote unit to the base unit upon receipt of an activating prompt from the status sensor or a prompt initiated at the base unit. A global positioning satellite receiver is provided in the remote unit for receiving global positioning information from a system of global positioning satellites having a position output connected to the communications means for entering position information upon receiving the activating prompt.

26 Claims, 5 Drawing Sheets

GLOBAL STATUS AND POSITION REPORTING SYSTEM

The invention relates to a global status and position reporting system for enabling a roving or semi-stationary system, in the following called "remote unit", to report to a particular base station, in response to locally or globally generated prompts, its status and position in the form of a prearranged status and position code or in the form of a verbal status report.

BACKGROUND AND PRIOR ART

In numerous operations involving at least one remote unit, that are not bound to a single fixed position, there is often a need for means for reporting on a global basis the status of a remote unit, and its global location at the moment of reporting. The term "status" as here used may relate to any condition or event at the remote unit such as for example an emergency condition, lack of operability for any reason, or simply a non-problem status.

Various status and position reporting systems are known in the prior art. As an example, U.S. Pat. No. 5,223,844, Mansell et al., shows a vehicle tracking and security system wherein a fleet of vehicles maintain communication via commercial or police radio with a control center, and wherein each vehicle obtains position data from a direct link with global positioning satellites (GPS).

Such a system has the drawbacks that no prearranged provision is made for contacting a particular base that is best suited to handle an emergency, considering the type of emergency and the global position. U.S. Pat. No. 5,225,842, Brown et al., shows a vehicle tracking system for reporting very precise vehicle positions using a position correction system, with its corrections received via a communication link. This system has the further drawback that no reporting facility is provided for reporting combined status and position information. U.S. Pat. No. 5,043,736, Darnell et al., shows a cellular position locating system, wherein a remote unit maintains a record of its global position by means of a GPS receiver in the remote unit. The remote unit also maintains communication with a base unit via a cellular radio link and a modem in the remote unit.

Although the prior art shows various versions of status and position reporting systems, none of the prior art is arranged to automatically select a particular base station based on combined status and position information, so that any type of event, emergency or particular status that may occur at the remote unit can be automatically reported to a particular base equipped to respond to the event, status or emergency.

SUMMARY OF THE INVENTION

It is accordingly an object of the invention to provide a global status and position reporting system that overcomes the drawbacks of the known systems of this general type, and provides further capabilities not known in the prior art.

The invention provides, briefly stated, a capability for a remote unit to report at any time any status of the remote unit, such as an emergency, mechanical breakdown, criminal attack, as well as less urgent states or events, to one or a selected one of several base units, and it has in particular the capability of selecting a base station best equipped and best located to provide assistance based on combined status and location information. A status to be reported may for example also be a no change in status, or a change in position beyond a certain limit, or no change in position. The remote unit may for example be an attachment to be worn by a person in cases wherein it is important to know if the person has moved beyond the limits of a certain area or track, or if the person has not moved beyond a certain limit. Such reporting would have significance for example in cases wherein a person is travelling or located in a wilderness and inadvertently strays from the predetermined path. The invention further provides the capability of selecting a communication facility such as satellite communication, cellular communication, special mobile radio communication or combination thereof, as may be available in different localities, on the basis of the location information obtained from "the GPS system.

The system provides further" features and capabilities, including exchange of verbal information, as described in more detail in the following part of the summary.

The invention provides a global status and position reporting system for a remote unit having a status and position transmit/receive unit with at least one status and/or event input connected to a respective status and/or event sensor for reporting at least one system status and/or event and position of the remote unit, and a status output connected to a communication interface; at least one base unit adapted for receiving a status and position report, disposed at a position spaced away from the remote unit; position independent communications means including communications interfaces respectively disposed in the remote unit and in the base unit for transmitting a status and position report from the remote unit to the base unit upon receipt of an activating prompt from the status sensor or a prompt initiated at the base unit. A global positioning satellite receiver is provided in the remote unit for receiving global positioning information from a system of global positioning satellites having a position output connected to the communications means for entering position information upon receiving the activating prompt.

According to a further feature of the invention, the communications means include a cellular communication interface for transmitting the status and position information via a cellular communications network, and/or a communication satellite interface for transmitting the status and position information via a communications satellite system.

In the global status and reporting system according to the invention, the communications means may further include a special communications interface for transmitting the status and position information via a special radio link.

According to still another feature of the invention, the status input unit may have a plurality of inputs connected to respective status sensors for receiving at least an equal plurality of states and/or events at the remote unit, and a status interpretation unit for interpreting the relative degree of urgency caused by each of the states and/or events.

The remote unit may additionally include a verbal status input of the status input unit for verbally entering a status and/or events.

The global status and position reporting system can additionally include a global position satellite position correction unit connected to the base unit or to the remote unit for receiving a position correction from a position correction facility.

The global position reporting system according to the invention advantageously further includes a communication controller having an input connected to the status and position unit and at least one output connected to at least one of the cellular communication interface, the communication satellite interface, or the special communications interface; wherein the communication controller has a further input connected to the global position receive unit for receiving status and position information, and at least one output connected to one of the cellular communication interface, the communication satellite interface, or the special communications interface.

The global status and position reporting system advantageously includes a global position correction facility connected to the base unit having a GPS receiving station at a geographically known position for generating position correction data wherein the position correction data are connected to the base unit for correcting the position data received from the remote unit.

The global status and position reporting system may further include a plurality of base units, a base selection table in the remote unit connected to the communication controller for selecting one of the base units in response to status and position information and to base selection data stored in the base selection table, wherein the base selection data include system position and remote unit status information.

The base station advantageously includes a computer in the base unit that receives uncorrected position data from the remote unit and the correction data from the geographically known position, e.g. by way of a land line. The base unit computer generates the corrected position data for the remote unit by applying the correction data to the uncorrected data from any remote unit.

It is also to be understood that the communication facility may be adapted to transmit a verbal status and/or event input from the remote unit, and that it may be further adapted to provide two-way voice and data communication between the remote unit and the base unit. This feature provides control capability of any remote unit from any base unit.

According to still another feature, the base selection table has alternate selection capability, which is activated to provide an alternate communication path if a first attempt to reach a base station is unsuccessful. This arrangement may include a provision for providing multiple attempts in reaching a base station, such that in case no connection is established after e.g. n attempts, a predetermined alternate path is attempted, for which provision is made in the base selection table.

In a further developed version of the invention there is provided an arrangement wherein the base selection table may be modified or expanded by means of data transmitted from any or selected ones of the base stations. In that manner the base selection table for one or several remote units can be arranged to provide the most favorable base selection at all times. Error control and error correction capabilities may be included in the data transmission arrangement in accordance with suitable error control strategies.

In accordance with still another feature, a paging capability may be provided, wherein a base station may page a selected remote unit and activate e.g. an annunciating device or manipulate or activate a certain device in that remote unit, in response to a paging code being transmitted from the base station.

According to an additional feature, public switched telephone network access capability may be provided for providing telephone access from a remote unit to a cellular system, or alternatively a base station may operate as a routing switch for emergency calls by means of a switching arrangement in at least one of the base units.

Further objects and advantages of this invention will be apparent from the following detailed description of a presently preferred embodiment which is illustrated schematically in the accompanying drawings.

BRIEF DESCRIPTION OF THE FIGURES

FIG. 1a shows a base selection table for combining status and position information and providing communication facility codes, routing information and alternate base selection.

FIG. 6 is a diagram of a time and position deviation reporting feature of the invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
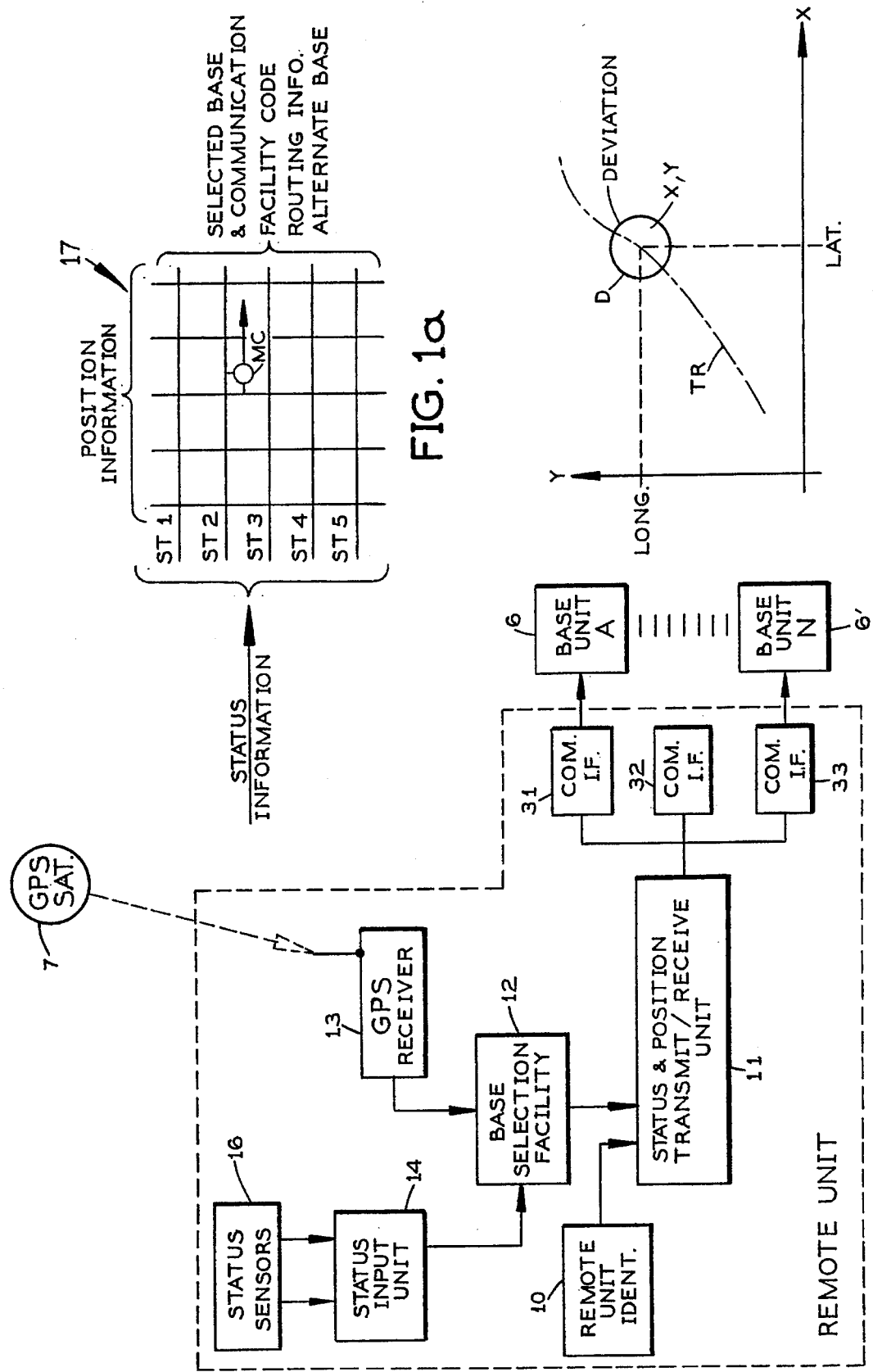
FIG. 1 is a block diagram of a remote unit with position input from a global positioning satellite.

In FIG. 1 a remote unit 1 includes a status and position transmit/receive unit 11 connected with transmit and receive facilities 31,32,33 for wireless communication with at least one base unit 6, and advantageously with a plurality of N base units including a last base unit 6'.

The remote unit 1 further includes a global positioning satellite receiver GPS 13 receiving continuous position information for the remote unit from a system of GPS satellites 7 in accordance with, for example, the currently installed GPS satellite system. The GPS receiver transmits the continuously updated position information for the remote unit to a base unit selection facility 12, which enables the remote unit to transmit status information from status sensors 16 for the remote unit to a selected one of the base units 6,6', selected in response to base unit selection data determined by the base selection facility 12.

The base selection facility 12 determines the address data for one of the base units by means of location data for the remote unit entered into a base selection table 17 (see FIG. 1a and 2) in the base selection facility. The base selection table 17 may further make the base selection in reponse to the particular status input from the status input unit 14, which is in turn connected with at least one, and typically a plurality of status sensors 16. The status sensors 16 are placed in or proximal to the remote unit to receive status information in regard to any status of the remote unit, such as, for example, but not exclusively, operability of its engines or power supplies, failure of any of its components, loss of personnel, loss of mobility, if it is in danger or exposed to assault of any type, or the status may simply be that of complete operability. The transmission of the status information may be prompted by any occurrence of a status to be reported or it may be transmitted in response to a prompt generated by one of the base units 6,6' transmitted via the respective communication interface 31,32,33 connecting the base units with the remote unit. This arrangement may have significant utility in case a remote unit is found to be roaming within a range served by different base units 6,6' having different transmission facilities according to communications interfaces 31,32,33, and/or wherein the base units have different capabilities for rendering assistance to the remote unit in accordance with the pending status. For example, the remote unit may be a motor vehicle, a truck, a sea-going vessel, or an aircraft that may operate within ranges served by, for example, a transmission facility in the form of cellular radio, or mobile radio as used by e.g. government entities, or single sideband radio as used by seagoing vessels. Depending on the location and/or the type of status, the base selection tables insure that a status report is transmitted only to base stations that are operative at the time and possess the capability to render the required assistance, and/or have an interest in receiving the particular status report.

The status sensors could accordingly be e.g. switches that automatically report various types of inoperability or danger to the mission of the remote unit. The switches could also be manually operated switches. The status input unit 14 may uniquely encode each status being reported by a status sensor 16 into a status code that is presented to the status tables 17 together with position information from the GPS receiver 13. The status tables provide a first choice for a base station selection, or, if applicable, one of several alternate bases if a first selected base is incapable of rendering assistance or is inoperative. It follows that a remote unit identification code may simultaneously be transmitted, and also that time and date information at the base may be included in the base selection criteria.

FIG. 1a shows a layout of a base selection table, wherein status information and position information are entered as address coordinates, and the base selection is information stored in the selected addresses MC of the tables. Alternate base addresses may be provided if a selected base is not responding when addressed by the remote unit. As an example, five status signals ST1–ST5 are shown as ordinates to the table, and position information is entered as abscissas. The output from the tables stored at the selected coordinate address MC may include a selected base, communication facility, routing information, alternate base and so forth.

Figure 2:
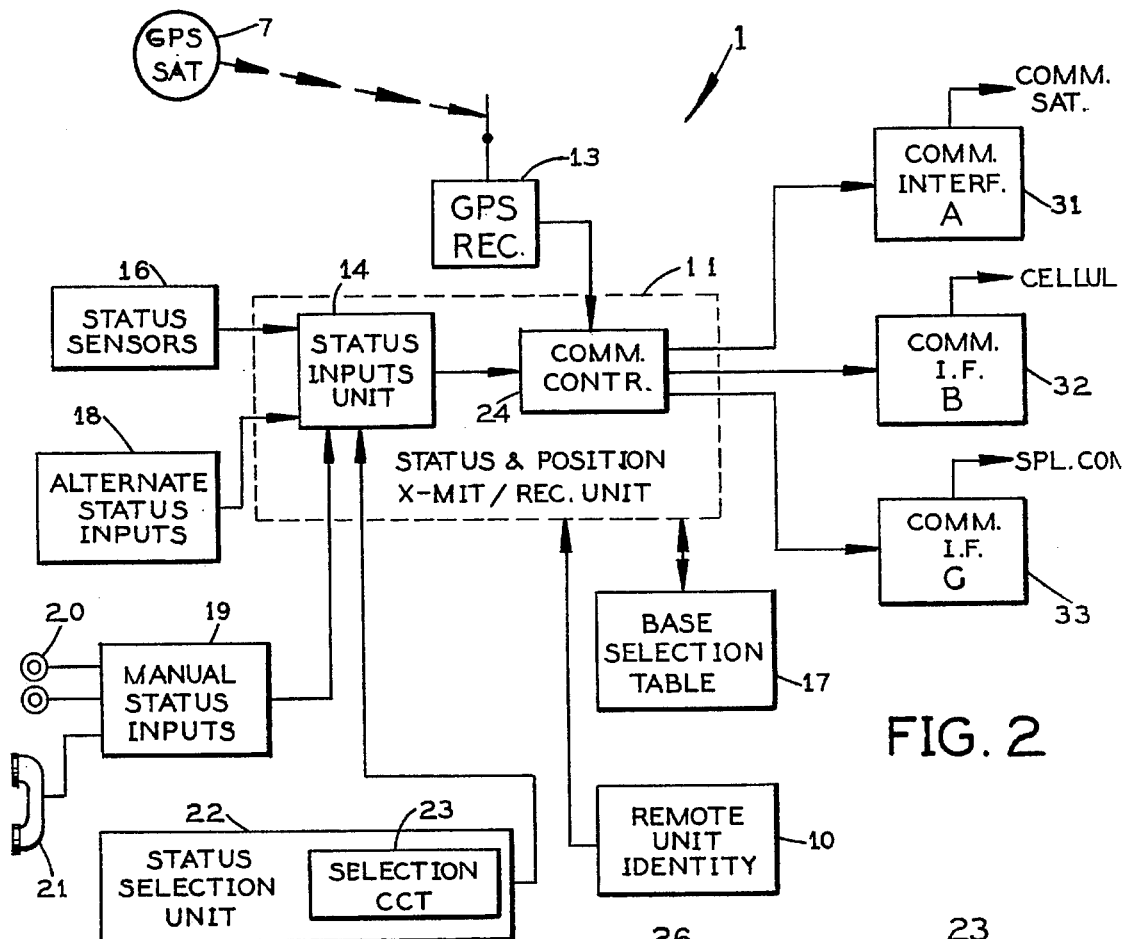
FIG. 2 is a block diagram of a remote unit, showing additional features of the unit.

FIG. 2 shows a remote unit 1 having additional capabilities to those shown in FIG. 1. An alternate status input circuit 18 provides additional statuses if more than one status may obtain. A manual status input unit 19 may provide statuses from one or more manually operated pushbuttons or keys 20 that are labeled according to a pre-determined status. Verbal status information can be transmitted, once a communication path has been established, by means of a voice transmit-receive handset 21. In case multiple status indications are present, status selection is performed by a status selection unit 22 containing a selection circuit 23 which selects a first arriving or first priority status by means of a priority or first come selection circuit such as, for example, a transfer contact chain or a counting circuit in well-known manner.

Figure 2A:
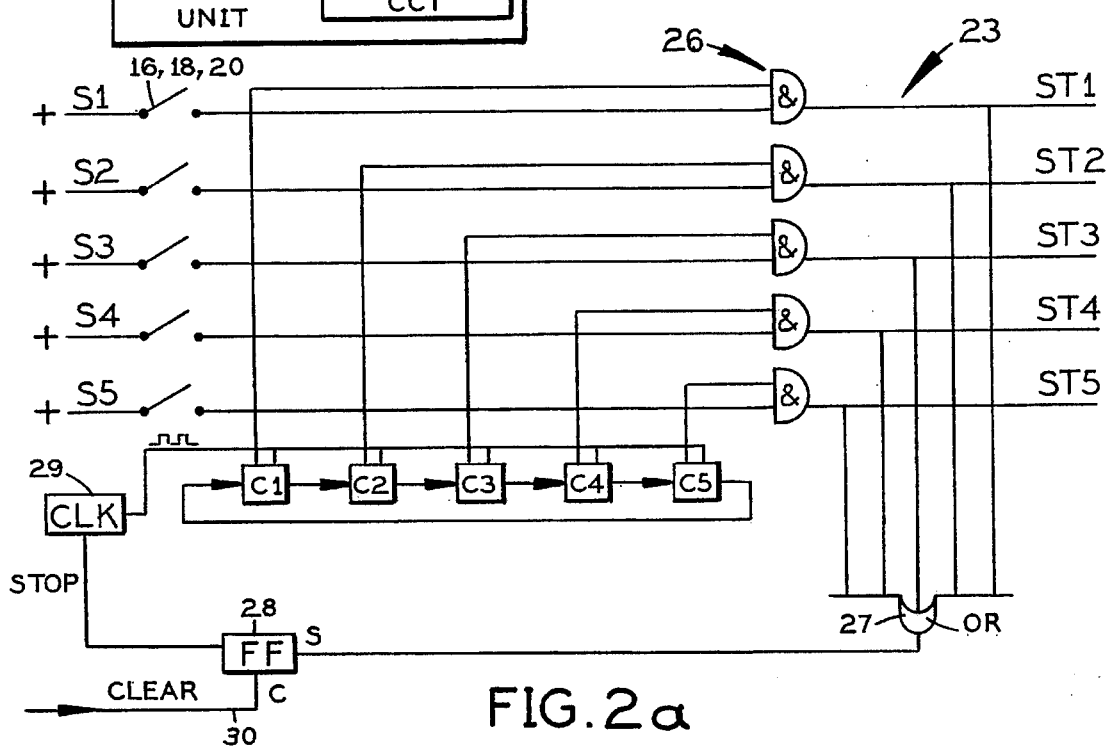
FIG. 2a is a block diagram of a status selection circuit.

FIG. 2a shows an example of a status selection circuit 23 having a counting chain with counting stages C1–C5 driven by a clock CLK 29. Each counting stage C1–C5 operates to select a respective AND-gate 26, each having one input connected to a status switch 16, 18, 20, and another input connected to a respective counting stage. If one status switch 16,18,20 is operated, indicating an active status, the counting chain will stop at the active status due to a stop signal from OR-gate 27 which has an input connected to each AND-gate output and sets a stop-flip-flop 28 which in turn stops the clock 29 at the respective AND-gate connected to an active status until the status information has been transmitted to a selected base and responded to, which causes the stop-flip-flop 28 to be cleared via a clear signal CLEAR on lead 30.

A communication control circuit 24 receives position information for the remote unit from GPS receiver 13 and the selected status from status input unit 14. Base selection is performed by the status selection circuit 22 in response to the sequence of arrival, and in accordance with the priority status code S1,S2 . . . S5, and the position information as presented to the base selection table 17 as described above. The communication control 24 activates the selected base via the particular communication interface 31,32,33 as indicated by an output from the base selection table 17, and the status information is transmitted via the selected communication interface 31,32,33 to the selected base unit 6,6'.

Each communications interface 31,32,33 provides the particular transmission protocol required for each transmission facility. In case different routing information is required for reaching different bases on the same communication facility, this routing information is also provided by the base selection tables 17 as part of the information stored at the selected address MC in the table.

In FIG. 2 the respective communication interfaces 31,32, 33 further include the radio transmitters and receivers required for communicating with the available communications facilities, e.g. a communications satellite, or a cellular network, or a special communications radio system as shown for the respective interfaces A,B and C. It follows that additional or fewer interfaces may be provided as may be available and/or necessary depending upon the particular mission of the remote unit 1.

Figure 3:
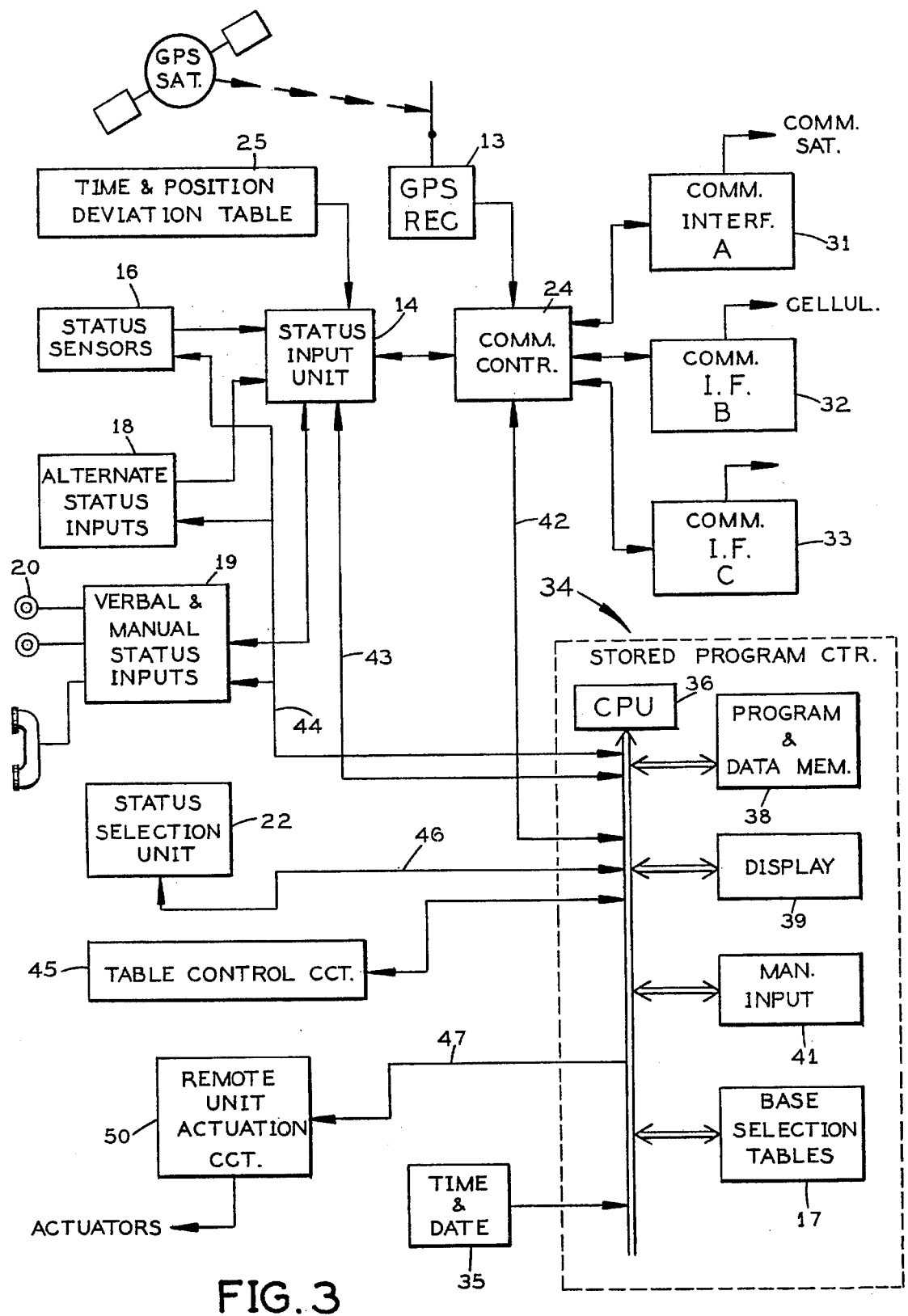
FIG. 3 is a block diagram of a remote unit showing details of a control arrangement for the remote unit.

FIG. 3 shows a remote unit wherein controls for the status reporting system are provided by means of a stored program control 34, which includes a central processing unit (CPU) 36, having a data bus 37 connected to a program and data memory 38, a display unit 39, a manual input 41 and the base selection table 17 stored in memory, e.g. as part of the program and data memory 38. The display 39 may in the simplest case be one or a few light indicators or, in more complex cases, a display panel with an alpha-numeric display for visually indicating status and operating conditions for the remote unit. The manual input 41 may include power on/off switch, the manual status switches 20 and any other manual input as required for operation of the system.

FIG. 3 further shows a time and position deviation table 25 which stores anticipated locations combined with respective times for the remote unit. The time and position deviation table 25 is advantageously arranged such that the anticipated position coordinates, e.g. longitude and latitudes of the remote unit, are entered into the table, and each coordinate point of the table contains stored in memory an anticipated time value within which the remote unit is anticipated to be located. Any deviation in real time from the stored time value will be reported as a reportable status. It follows that a given deviation tolerance is also to be applied to the time deviation before a deviation is reported. The allowable tolerances may be variable stored parameters, or it can be a fixed parameter. Also, any deviation in actual position from an anticipated position stored in the time and position deviation table can be a reportable status. The actual position is known from the GPS receiving unit 13, and actual time, including date, is obtained from a time and date circuit 35 connected to the CPU 36. Also, a given allowable deviation in position can be stored in the time and position deviation table 25.

Table control and adjustment means are provided in the form of a table control circuit 45 which enables a base station to modify and control the contents of the various tables in the remote unit. The table control circuit 45 communicates with the base selection tables 17 and the time and position deviation table 25 via the CPU data bus 37, and receives instructions as to table contents to be modified via the communications control circuit 24, and the communications interfaces 31,32,33 which also communicate with the CPU data bus 37.

FIG. 6 illustrates the tracking feature of the remote unit. At preset times the position coordinates as obtained from the GPS receiving circuit 13 are entered as longitude and latitude coordinates to determine a point x,y on the anticipated track of the remote unit, wherein the anticipated track is indicated by a dash-dot line TR. The allowed position deviations and time values for the remote unit are stored in the time and position deviation table 25 at point x,y. The allowable deviations are indicated for example as a circle D. It follows that the actual location point x,y may not fall on the anticipated track TR, but may fall within the stored deviations in time and location, in which case no reporting is initiated. If, however, the actual position and time fall outside the stored deviations a status report is initiated.

The contents of the base selection table 17 and the time and position deviation table 25 are controlled at the base unit (FIG. 6) from a keyboard 128 connected to a manual console 125.

The stored program control 34 is connected via control lines 42,43,44,46,47 respectively with communications control 24, status input unit 14, the status sensors 16, alternate status inputs 18, and verbal and manual status inputs 19, and status selection unit 22. The control functions of the remote unit is performed in accordance with a control program stored in the program and data memory 38° The control program is structured in accordance with a flowchart shown in FIG. 4.

Figure 4:
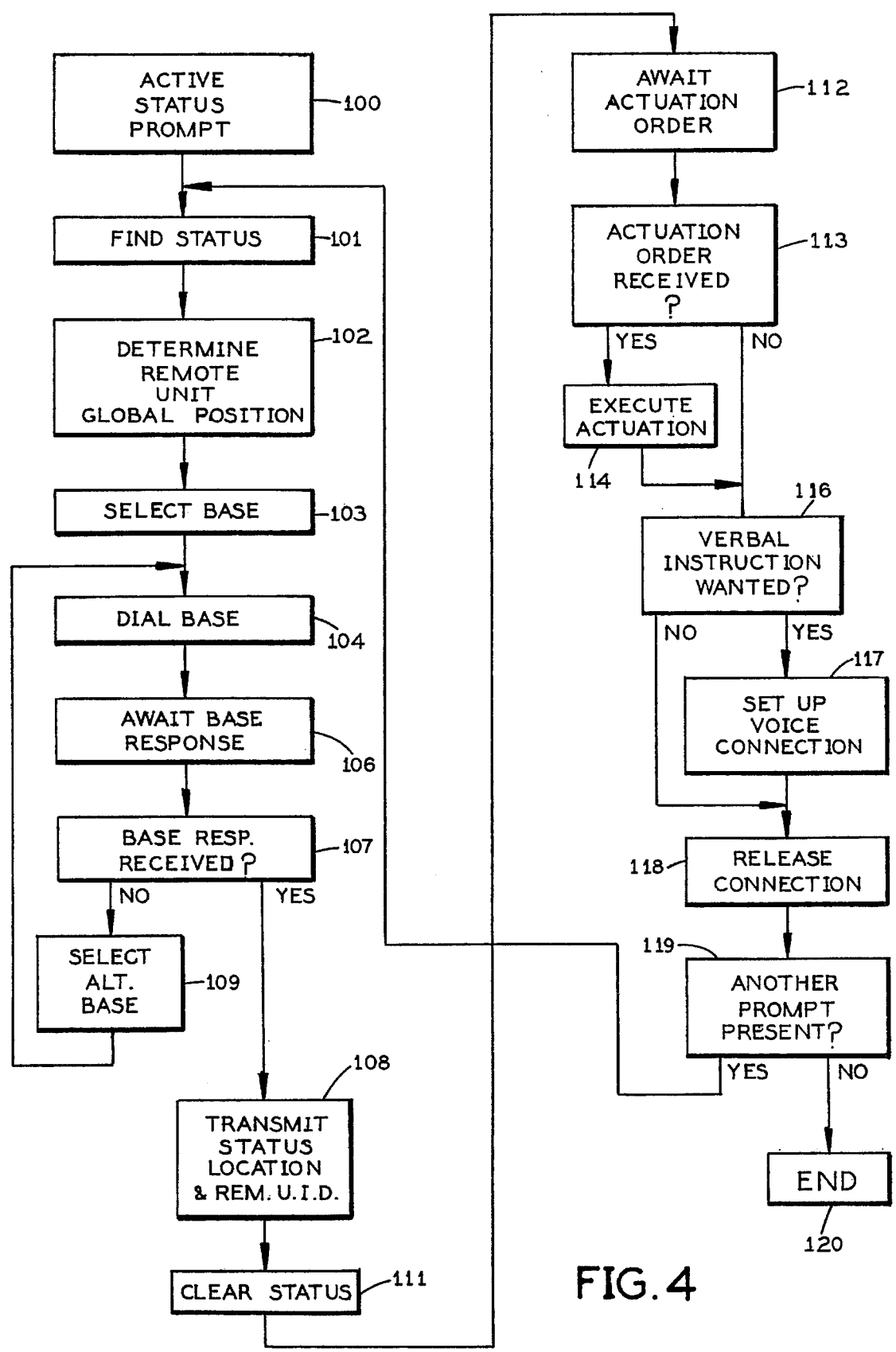
FIG. 4 is a flowchart showing steps of the operation of the system.

In FIG. 4, after receiving an active status prompt in step 100, when a status from an active status sensor has been found by status selection circuit unit 22 in a status search started in step 101, the global position of the remote unit is determined in step 102, and a base selection is performed in step 103 on the basis of the status code and the position information. Next, the selected base is dialed or contacted by means of the base address information received from the base selection table 17. After dialing the selected base, a base response signal is awaited from the base in step 106, indicating that an active base has been reached. If no response is received within a given waiting period, an alternate base selection is made in step 109, and an alternate base is dialed in step 104, followed again by step 106 until a base returning a response signal is received in step 107. When the base response signal is received by the remote unit the status code and position information and the remote unit identification code are transmitted to the responding base in step 108. After the response code is received, a clear signal is transmitted from the responding base to the status selection circuit 23 to clear stop-flip-flop 28, and selection circuit 23 is released by the clear signal as shown in FIG. 2a. Next, an actuation order is awaited from the base unit in step 112 in case an actuation is to be performed at a remote unit by remote unit actuation circuit 50 in FIG. 3.

The actuation order is a code returned from the base in step 113, in case an actuation order is to be performed, that operates to actuate certain preselected actuators at the remote unit, which can serve to overcome, or ameliorate trouble conditions at the remote unit, indicated by the status code. After the actuation is executed in step 114, or if no actuation is to be performed, an operator at the base may be alerted in step 117 who can verbally communicate with a person at the remote unit requesting verbal transmission of a remote unit status by means of the manual status input circuit 19 in FIG. 2. If no verbal instructions are wanted in step 116 the connection between the remote unit is released in step 118 in accordance with conventional communications protocol, e.g. by a release signal from the base and the connection is cleared. In case another status prompt is present in the remote unit after the release the entire procedure is repeated from step 119, beginning with step 101 as described above. When a prompt is no longer present, i.e. all status reports have been cleared, the procedure is ended in end step 120.

Figure 5:
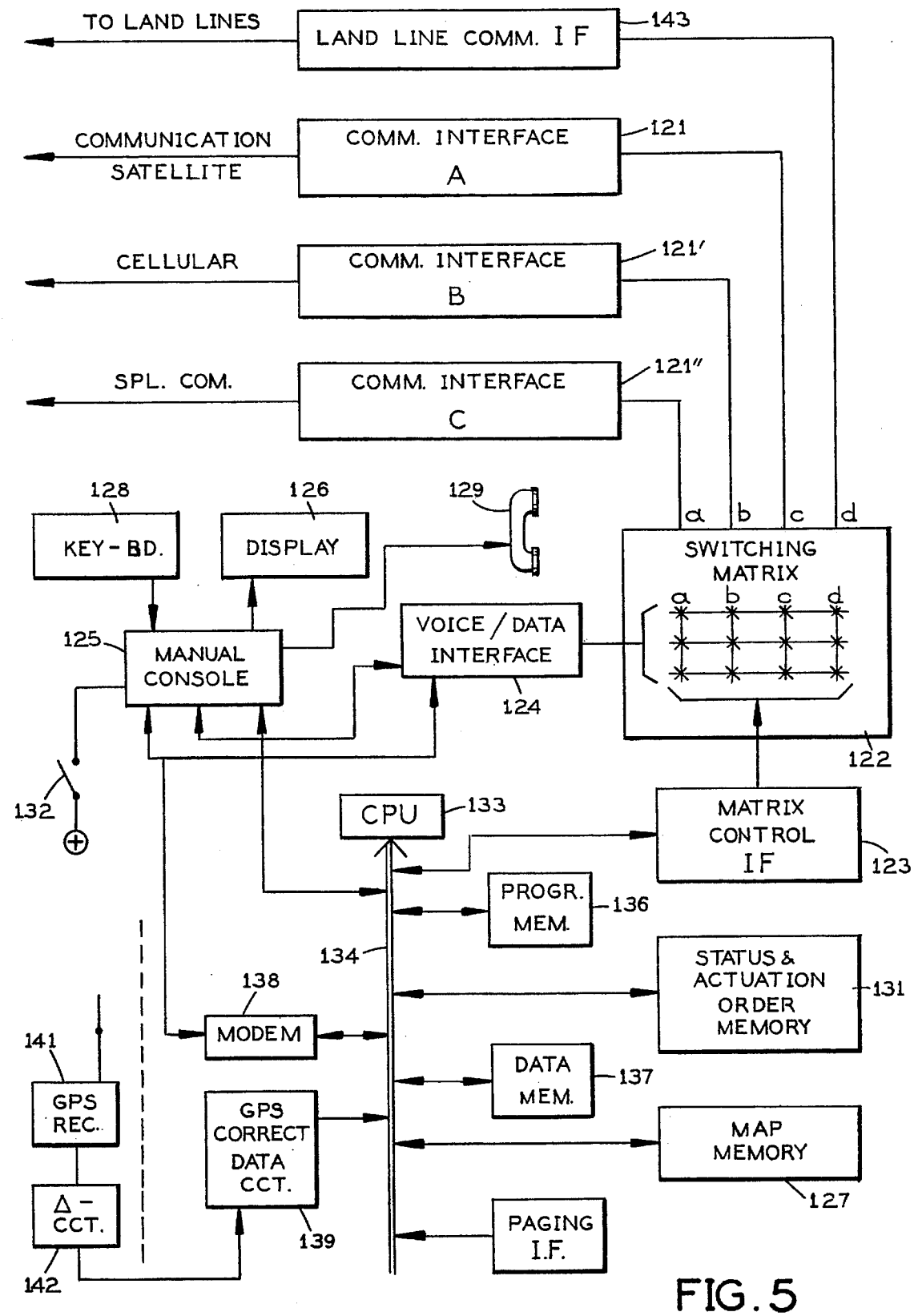
FIG. 5 is a block diagram of a base unit.

FIG. 5 shows the major blocks of a base unit, wherein base communications interfaces 121,121' and 121", as required, are provided. The communications interfaces have outputs connected to respective inputs a,b,c of a switching matrix 122 having switched crosspoints connected to a matrix output d under control of a conventional matrix control interface 123.

An incoming status report is connected via the switching matrix 122 to a voice/data interface 124. The incoming status code is in the preferred mode of operation, first connected to a manual console 125, attended by a base operator. The status code is displayed on display 126, and if requested, a map of the location of the remote unit may be displayed on the display 126. A map memory 127 contains all pertinent map information, and responds to the location information of the remote unit, transmitted with the status code. The operator may respond with a voice response if verbal voice communication is indicated from the remote unit.

If verbal communication is not requested, the status code together with remote unit identity code, position information, time and date are recorded in a status and actuation order memory 131.

The operator may manually respond from keyboard 128 with an actuation order which is adapted to generate an actuation in the remote unit via the remote unit actuation circuit 50 in FIG. 3. If no operator is present or available as indicated by a time-out before an operator response, or in response to the operation of a No-Operator (NO) switch 132 on the operator console, the status information with the position information and remote unit identity code is stored in the status and actuation order memory 131. If an actuation order, which is pertinent to the received status and remote unit identity code, the actuation order will be transmitted back to the responding remote unit as described above.

All transactions to be performed by the base unit are controlled by a central processing unit CPU, 133, having a data bus 134, which interconnects the blocks of the base unit described above with a program memory 136 containing all control programs for the base unit, and a data memory 137. The CPU performs all control functions according to the flowchart of FIG. 4.

Data and voice transmitted between the base unit and the remote unit may be transmitted, for example, in analog form on voice channels using conventional modem formats for data transmission. Voice and data may alternatively be transmitted in digital format, e.g. in conventional D1,D2 or D3 format as used for digital carrier transmission or any suitable format. In case voice band transmission is used, a conventional modem 138 is connected between the voice/ data interface 124 and the data bus 134, while voice is transmitted between the voice/data interface 124 and the manual console 125 by means of conventional voice transmission circuits, such as hybrids, balance circuits, etc. (not shown).

A conventional remote unit position correction interface 139 can be provided which provides GPS position correction data from a GPS receiver 141 located at a precisely known position, which transmits position corrections via a difference circuit 142 to a GPS correction data circuit 139, which in turn provides the GPS-position correction data to the CPU via data bus 134 for presenting precise location data to the operator display 126.

The switching matrix 122 can advantageously be expanded to include a data and voice connection between the base units to provide access from any or all remote units to any other base unit even if a remote unit may be unable to reach a particular base unit via its available communications interfaces. Such access can be provided, e.g. by means of a landline communications interface 143 connected to a vertical d of switching matrix 122.

I claim:

1. A status and position reporting system comprising at least one movable remote unit, a plurality of bases disposed apart from said remote unit, status determining means and position determining means in said remote unit, status and position reporting means in said remote unit connected to said status determining means and said position determining means for reporting status information and position information pertaining to said remote unit, remote unit communication means in said remote unit connected to said status and position reporting means for communicating said status and position information from said remote unit to said base; and base selection means in said remote unit connected to said status and position reporting means operative for selecting one of said bases in response to data in said status and position information.

2. A status and position reporting system according to claim 1, wherein said position determining means in said remote unit is operative for determining global position data for said remote unit.

3. A status and position reporting system according to claim 2, wherein said base selection means include a base selection table having coordinates for respectively receiving said status information and said position information, said base selection table having storage means for storing addressing information connected to an input of said remote unit communications means for addressing a selected one of said plurality of bases.

4. A status and position reporting system according to claim 3, wherein said addressing information includes identification data for said remote unit.

5. A status and position reporting system according to claim 3, wherein said addressing information includes alternate base selection data for selecting an alternate one of said bases in case a first selected base is unavailable.

6. A status and position reporting system according to claim 2, wherein said position determining means include a global positioning satellite receiver connected to an input of said position determining means.

7. A status and position reporting system according to claim 1, wherein said remote unit communications means include at least one remote unit communications interface disposed in said remote unit, said remote unit communications interface being operative for communicating said status and position information to said base.

8. A status and position reporting system according to claim 7, wherein said remote unit communications interface includes radio transmit/receive devices being adapted for communication with at least one of a satellite communications system, a cellular radio communications system, and a special radio communications system.

9. A status and position reporting system according to claim 1, wherein said status determining means include a plurality of status sensors, each adapted for reporting a respective remote unit status.

10. A status and position reporting system according to claim 1, wherein said status determining means includes at least one manual switch for manually reporting status information.

11. A status and position reporting system according to claim 1, wherein said status determining means include a voice transmitter/receiver for verbally reporting status information.

12. A status and position reporting system according to claim 1, wherein said status determining means is operative for reporting a plurality of statuses, and status selecting means connected to said status determining means for selecting one of said plurality of statuses.

13. A status and position reporting system according to claim 12, wherein said status selecting means include sequential status selecting means for sequentially selecting one of said statuses.

14. A status and position selecting system according to claim 13, wherein said sequential status selecting means include a counting chain having a plurality of counting stages, an equal plurality of AND-gates each having one input connected to a respective counting stage and another input connected to a respective status sensor, a clock generator for driving said counting chain, an OR-gate having an equal plurality of inputs each connected to a respective AND-gate output and an OR-gate output, a stop-flip-flop having a set input connected to said OR-gate output and a clear input connected to a response lead for clearing said stop-flip-flop upon receiving a response signal from said base.

15. A status and position reporting system according to claim 1, wherein said remote unit includes a stored program control for controlling said status determining means, and said position determining means, said stored program control composed of a central processing unit, a program and data memory connected to said central processing unit, and base selection tables included in said program and data memory.

16. A status and position reporting system according to claim 1, wherein said base includes at least one base communication interface operative for wirelessly communicating with said remote unit communications means, a manual console having an input connected to said base communications interface, and an information display connected to said manual console for visually displaying status information received from said remote unit.

17. A status and position reporting system according to claim 16, wherein said information display is adapted for displaying status and position information from said remote unit.

18. A status and position reporting system according to claim 16, wherein said information display is adapted for displaying remote unit identity information from said remote unit.

19. A status and position reporting system according to claim 16, including a plurality of remote units, further including a switching matrix in said base having a first plurality of matrix inputs, and a second plurality of matrix outputs, wherein at least one of said matrix inputs is connected with said base communication interface.

20. A status and position reporting system according to claim 16, including a keyboard connected to said manual console for manually transmitting information to said remote unit.

21. A status and position reporting system according to claim 11 including a voice transmitter/receiver connected to said manual console for verbally communicating with said remote unit.

22. A status and position reporting system according to claim 19, including a landline communications interface connected to one of said matrix inputs for providing landline communication for said manual console.

23. A status and position reporting system according to claim 1, further including a clock and a time and position deviation table in said remote unit for containing anticipated time and position coordinates for said remote unit, said time and position deviation table having an output connected to said status and position reporting means for initiating a status report indicating actual deviation in time and position of said remote unit from said anticipated time and position coordinates.

24. A status and position reporting system according to claim 23, including table control means in said remote unit communicating with said time and position deviation table for remotely controlling said time and position deviation table from said base.

25. A status and position reporting system according to claim 3, including further table control means in said remote unit communicating with said base selection table for remotely controlling said base selection table from said base.

26. A status and position reporting system according to claim 17, including position correction means in said base connected with said information display for applying position correction data to said position information, said position correction means including a fixed global position satellite receiver disposed at a known accurate position, and correction determining means connected to said information display for applying said position correction as a difference between said fixed global position satellite receiver output and said position information.

* * * * *